(12) United States Patent
Wechsler

(10) Patent No.: US 7,038,586 B2
(45) Date of Patent: May 2, 2006

(54) VEHICLE HORN ACTUATION MECHANISM AND METHOD

(76) Inventor: Lawrence I. Wechsler, One Wooleys La., Great Neck, NY (US) 11023

( * ) Notice: Subject to any disclaimer, the term of this patent is extended or adjusted under 35 U.S.C. 154(b) by 0 days.

(21) Appl. No.: 10/213,668

(22) Filed: Aug. 6, 2002

(65) Prior Publication Data

US 2002/0190848 A1 Dec. 19, 2002

Related U.S. Application Data

(63) Continuation of application No. 09/560,387, filed on Apr. 28, 2000, now abandoned.

(60) Provisional application No. 60/131,582, filed on Apr. 29, 1999.

(51) Int. Cl.
*G08B 21/00* (2006.01)

(52) U.S. Cl. .................. 340/540; 340/392.4; 340/465; 340/425.5; 340/328; 340/474; 200/61.54; 200/61.88

(58) Field of Classification Search ................ 340/450, 340/425.5, 465, 540, 392.4, 328, 474; 455/602; 701/36, 41; 200/61.54, 61.88
See application file for complete search history.

(56) References Cited

U.S. PATENT DOCUMENTS

| | | | | |
|---|---|---|---|---|
| 1,538,572 | A * | 5/1925 | Miller | 200/61.54 |
| 4,405,924 | A * | 9/1983 | Shinoda et al. | 340/825.72 |
| 4,518,836 | A * | 5/1985 | Wooldridge | 200/61.54 |
| 4,608,550 | A * | 8/1986 | Umebayashi et al. | 307/10.1 |
| 4,672,214 | A * | 6/1987 | Takahashi et al. | 250/551 |
| 4,785,194 | A * | 11/1988 | Gottlieb | 307/10.1 |
| 4,792,783 | A * | 12/1988 | Burgess et al. | 307/10.1 |
| 5,309,135 | A * | 5/1994 | Langford | 338/211 |
| 5,569,893 | A * | 10/1996 | Seymour | 200/61.54 |
| 5,721,541 | A * | 2/1998 | Repp et al. | 341/20 |
| 5,847,664 | A * | 12/1998 | Zamplas et al. | 341/20 |
| 6,253,131 | B1 * | 6/2001 | Quigley et al. | 701/36 |

* cited by examiner

*Primary Examiner*—Tai T. Nguyen

(57) ABSTRACT

A horn actuation mechanism senses a deliberate movement of a driver's hand on a side of a steering plane distant from the driver, the steering wheel plane lying crossswise a rotational axis of the steering wheel and approximating a plane bisecting a peripheral gripping region of the steering wheel. The vehicle horn is energized in response to the sensing of such movement. A hand-operational portion of the horn actuation mechanism is advantageously disposed in a position in which a hand grasping a peripheral gripping portion of the wheel can simultaneously actuate the mechanism without removal of the hand from controlled contact with the wheel.

19 Claims, 2 Drawing Sheets

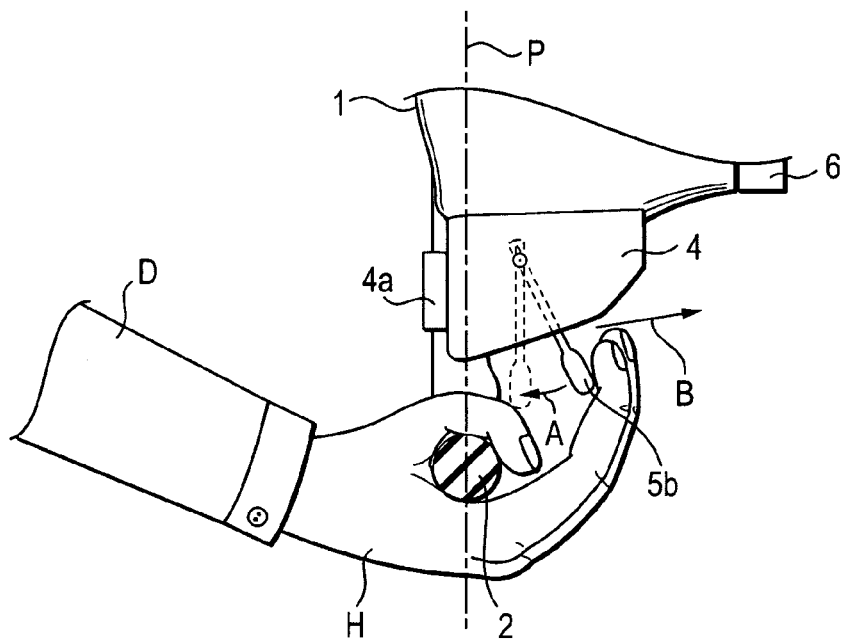
FIG. 3
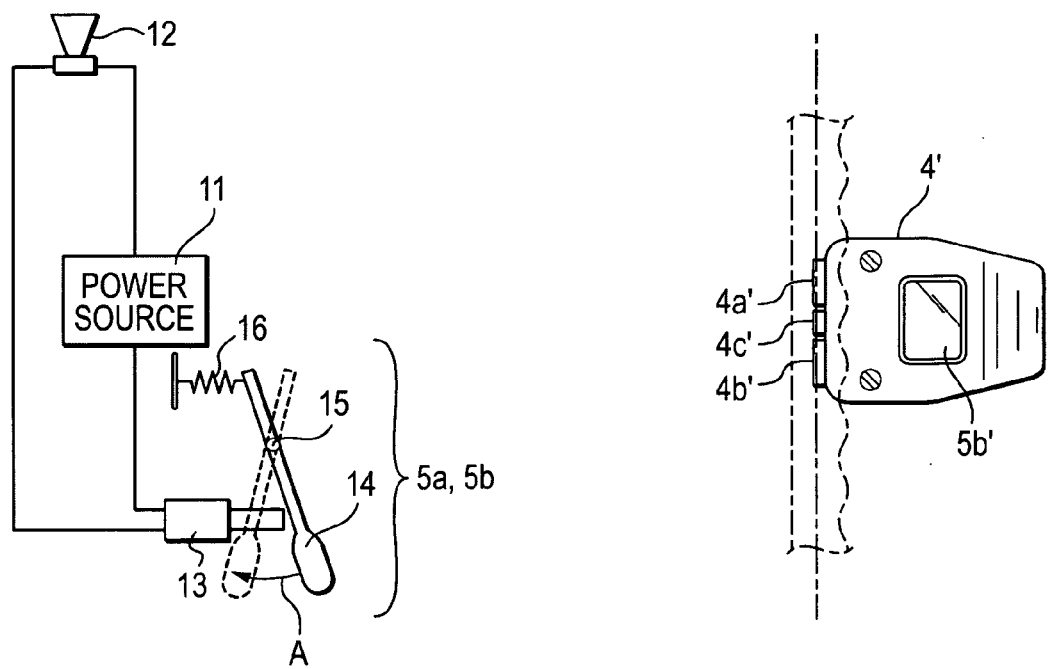
FIG. 4
FIG. 5

VEHICLE HORN ACTUATION MECHANISM AND METHOD

CROSS REFERENCE TO RELATED APPLICATIONS

This application is a continuation of application Ser. No. 09/560,387, filed Apr. 28, 2000 now abandoned entitled VEHICLE HORN ACTUATION MECHANISM AND METHOD, which in turn claims the benefit of U.S. Provisional Application No. 60/131,582 filed Apr. 29, 1999 entitled VEHICLE HORN ACTUATION MECHANISM.

BACKGROUND OF THE INVENTION

The present invention relates to vehicle horns, and more particularly to a method of actuating a horn, and a mechanism for implementing the method, which facilitates reliable user actuation of a horn during potentially hazardous situations.

With the evolution of vehicle design, placement of the switch for actuation of a vehicle horn has been correspondingly altered to accommodate newly added or changing features. For example, many passenger vehicles are now provided with cruise controls and audio volume and channel selectors in a readily accessible position on the steering wheel to simplify selection by a driver of the various parameters controlled thereby during operation of the vehicle, for the intended purpose of improving safely by obviating the need to search for the controls remotely located elsewhere on the dashboard and/or for improved driver convenience. Supplemental placement of horn actuation switches or buttons adjacent such auxiliary controls is not generally practiced for fear that the driver may confuse the horn actuation mechanism with the proximately located audio or cruise control button. Horn buttons which were therefore once conventionally located in the positions now occupied by the aforementioned controls have consequently been abolished and are placed instead in a central area of the steering wheel.

Such central placement of the horn actuation mechanism, however, creates design and safety problems associated with the addition of passive restraint systems requiring placement of an airbag behind the centrally located horn actuation switch. In addition, since the centrally located horn actuation mechanism is directly in front of the airbag, in an emergency situation in which a horn is actuated by the hand of the driver and which situation concludes in an accident in which the airbag is deployed, the driver's hand will be in the path of such deployment, resulting in the potential for unnecessary injury to the driver's hand or face. Also, such location central of the steering wheel prevents actuation of the horn mechanism by the same hand holding the wheel. As such, a driver using a cellular phone, holding a cup of coffee or the like, or in the extreme case, a handicapped driver deprived of the use of one of his hands or arms, will be unable to operate the horn while maintaining controlled steering of the vehicle.

Accordingly, it is an object of the invention to provide a horn actuation mechanism which overcomes the drawbacks of the prior art.

It is a further object of the invention to provide a horn actuation mechanism which may be operated reliably by the same hand grasping the steering wheel and in which confusion with other controls is effectively avoided.

It is a still further object of the invention to provide a horn actuation mechanism which is accurately controlled by hand manipulation of same for actuation in a manner and intensity as intended by the driver.

It is yet another object of the invention to provide a horn actuation mechanism which may be implemented in a cost effective, attractive and simplified manner.

SUMMARY OF THE INVENTION

Briefly stated, there is provided, a horn actuation mechanism which is located on a side of a plane distant from a driver, the plane being arranged crosswise to a rotational axis of a steering wheel and which plane passes roughly through a peripheral gripping portion of the wheel. The horn actuation mechanism is advantageously disposed in a position in which a hand grasping the peripheral gripping portion of the wheel can simultaneously actuate the mechanism without removal of the hand from controlled contact with the wheel. The horn actuation mechanism includes a driver-actuatable switch for initiating sounding of the horn, conveniently provided, for example, in the form of a toggle or push button.

In an advantageous embodiment, the horn actuation mechanism comprises a switch mounted to the rotatable central portion of the steering wheel on a side of the steering wheel plane distant from the driver and facing radially outward therefrom, the switch being selectively opened and closed responsive to movement of a paddle biased away from the driver in a forward direction of the vehicle and urgable towards the driver by manipulation by the fingers of the hand opposed to the thumb while the thumb remains hooked about the gripping portion of the wheel to permit effective simultaneous maintenance of steering control of the vehicle by the same hand.

In a particularly advantageous embodiment, the horn mechanism is provided as part of a control module which houses auxiliary wheel-mounted controls such as cruise controls and audio controls, and which are mounted to the steering wheel as add-on, preassembled components.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 3 is a detailed schematic top view of the horn actuation mechanism provided as part of the auxiliary module in accordance with the embodiment of FIGS. 1 and 2;

FIG. 4 is a schematic diagram illustrating operation of the horn actuation device of FIGS. 1–3; and FIG. 5 is a side elevation of an embodiment in which the horn actuation mechanism includes a button actuated switch incorporated in an auxiliary module.

DETAILED DESCRIPTION OF THE PREFERRED EMBODIMENT

The horn actuation mechanism for use in vehicles in accordance with the invention broadly embraces a mechanism by which a deliberate movement of the hand on a side of the steering wheel plane distant from the driver can be sensed, the horn being energized in response to the sensing of such movement. For purposes herein, a "steering wheel plane" is defined as a plane arranged crosswise a rotational axis of the steering wheel and which approximates a plane bisecting a peripheral gripping region of the steering wheel. Positioning of the mechanism such that hand movement can be perceived on a side of the steering wheel plane distant from the driver, inter alia, effectively prevents confusion with other controls already conventionally located on a side of the steering wheel plane proximal to, and generally facing, the driver, such as audio controls and cruise controls of the type provided in presently available vehicles. The term "horn" herein is used broadly and generically to describe any device which emits a detectable warning signal.

Figure 1:
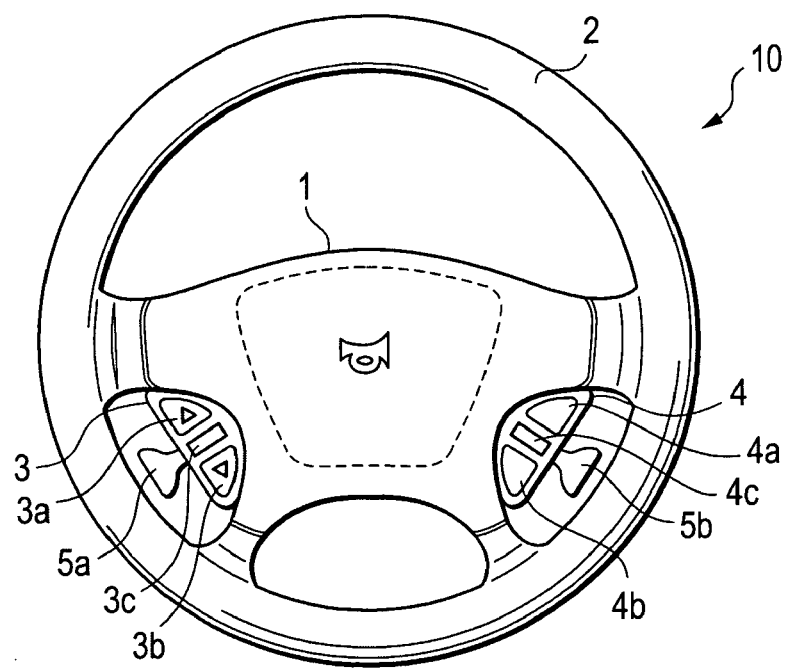
FIG. 1 is a driver view of a steering wheel in which an embodiment of a horn actuation mechanism in accordance with the invention is advantageously included as part of a module for auxiliary controls.
Figure 2:
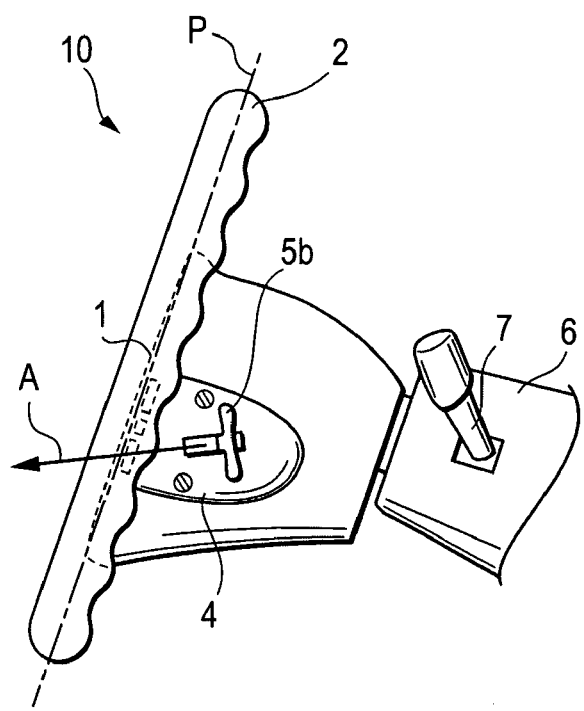
FIG. 2 is a side elevation of the steering wheel incorporating the embodiment of FIG. 1.

Referring now to the figures, an advantageous embodiment of the invention is exemplified in FIGS. 1 and 2. A steering wheel, generally designated 10 includes a central region 1 and a peripheral gripping region 2. An airbag (not shown) is mounted behind an external capping structure in the central region 1 in a conventional manner. Steering wheel 10 further includes wheel-mounted auxiliary controls provided, for example, as an audio module 3 and a cruise control module 4 located in opposed positions, mounted to the central region 1 of the steering wheel 10. The audio module 3 in accordance with standard design typically includes a volume increase button 3a, a volume decrease button 3b, and a channel select button 3c. Similarly, the cruise control module commonly includes a set button 4a, a resume button 4b and a select button 4c.

As noted above, in conventional vehicles, a horn actuation mechanism is generally provided in the central region 1, operation of which requires applied force to the position of the steering wheel 10 depicted in FIG. 1 as a horn-shaped icon (and generally limited to a bounded area as indicated by the broken lines in FIG. 1), and location of which is interposed between the driver and the airbag. In accordance with the claimed invention, however, a horn actuation mechanism is alternatively or additionally located on a side of a steering wheel plane P distant from a driver D. As depicted in the illustrative example of FIGS. 1 and 2, two such horn actuation mechanisms are provided, for advantageous activation by either hand, one as part of each of the auxiliary modules comprised of the audio module 3 and the cruise control module 4, the horn actuation mechanisms designated respectively by the reference numerals 5a and 5b. It is noted that, although inclusion of such horn actuation mechanisms 5a, 5b as integral parts of the auxiliary modules 3, 4 is deemed particularly convenient and advantageous from a constructional standpoint, the invention need not be limited to such arrangement, and broadly contemplates placement of at least one horn actuation mechanism in any feasible mounted position in which at least a hand-operational portion thereof is located on a side of the steering wheel plane distant from the driver. In this regard, such a horn actuation mechanism in accordance with embodiment of the invention may be mounted either to a rotatable portion of the steering wheel, such as in the illustrated example, or integral therewith, or alternatively, mounted to a fixed steering wheel structure, such as a column 6 to which the turning signal actuation mechanism (not shown) or windshield wiper mechanism 7 is conventionally mounted, or to another fixed part of the vehicle, such as the dash board from which it structurally extends within convenient reach of the driver for actuation. Furthermore, although shown in the example as mounted at least partially to the central region 1, a suitably designed horn actuation mechanism in accordance with embodiment of the invention could be incorporated directly in the peripheral gripping region 2, or mounted thereto, and located, for example, in one or more positions around the top arcuate portion of the wheel. This would permit convenient accessibility to the horn actuation mechanisms by drivers who prefer to hold the wheel at the top, rather than at the sides or bottom. In such embodiment, wiring for communicating with the horn would be conveniently routed internally of the peripheral gripping region 2. It is further noted that there is not requirement that any or all operational elements of the horn actuation mechanisms 5a, 5b be located exclusively on the side of the steering wheel plane P distant from the driver D, so long as a deliberate hand motion on such distant side can be detected by at least a portion of the mechanisms 5a, 5b.

It is deemed particularly advantageous to practice of the invention to locate the hand-operational portion of the horn actuation mechanism in a position within reach of the same hand by which the peripheral gripping portion 2 of the steering wheel 10 is gripped. For example, as depicted in FIG. 3, a hand H is shown gripping the wheel by a thumb hooked about the peripheral gripping portion 2 of the steering wheel 10, the fingers opposed to the thumb simultaneously being within reach of the hand-operational portion of the horn actuation mechanism 5b advantageously provided as part of the cruise control module 4 (and although not shown, analogously implemented in the audio module 3). This feature permits steering and horn actuation to be implemented simultaneously by single hand operation, such as when the other hand is occupied and/or otherwise unavailable.

It is noted that the horn actuation mechanism may employ any conventional switch configuration in carrying out the invention in practice. For example, the horn actuation mechanism may comprise a switch, actuatable by structure which is slidably mounted for movement in a sliding direction, or alternatively a pivotably mounted, lever-type switch arrangement. Also a depressible button located on a side of the steering wheel plane distant from the driver is also contemplated. Moreover, any and all switching mechanisms for actuating horn operation responsive to driver actuation hand movement, such as electronic sensors, etc., are also contemplated within the intended scope of the invention. Finally, although the horn is most conveniently actuated by closure of the switch, in certain applications it might be desirable to have the switch normally in a closed position, and provide a circuit of suitable design which causes the horn to be energized upon opening of the switch. Such variant is likewise deemed to be within the contemplated scope of the invention.

In the embodiment selected conveniently for purposes of disclosure, and as best depicted in FIG. 3, the horn actuation mechanism 5b (and similarly 5a not shown) is a switch pivotably mounted internal of the auxiliary control module, i.e in the illustrated example, the cruise control module 4, and which switch is biased away from the driver D (by, for example, a spring not shown) in a biasing direction B as shown by the arrow pointing right in FIG. 3. To operate the horn, the switch of horn actuation mechanism 5b is pivotably urged in an actuation direction A as depicted by the arrow pointing left in FIG. 3 by the fingertips of the hand H.

Depiction of the precise nature of the internal switching structure and the mechanics for biasing of the horn actuation mechanism is omitted, since such configuration and design of such suitable switches are well known to those possessed of ordinary skill in the art, and disclosure is therefore considered redundant in light of the myriad possible switching structures which could adequately satisfy the broad requirements of the claimed invention.

FIG. 4 illustrates the basic operation of the embodiment described above with reference to FIGS. 1–3. Each of the horn actuation mechanisms 5a, 5b includes a switch 13. A power source (car battery or generator) is connected in series with a vehicle horn 12 through the switch 13, such that when the switch 13 is closed, the horn 12 is energized, and sounds. The horn actuation mechanism 5a, 5b also includes a hand-operational portion, provided conveniently in the form of a paddle 14, and which forms part of a mechanism by which a deliberate movement of the hand on a side of the steering wheel plane distant from the driver can be sensed. The paddle 14 is mounted on a pivot 15, and a biasing spring 16, connected thereto, is attached at an opposite end to a fixed structure. As such, the paddle 14 is biased against movement in the direction indicated by the arrow A. When the paddle 14 is urged in the direction A by the fingers of the hand (to a position indicated by the broken lines), the switch 13 is closed, and the horn 12 is energized. The paddle 14 returns to its normally biased position (solid lines) when released, and the horn 12 no longer sounds. It is noted that the element denoted by designator numeral 13 can alternatively be provided as a position sensor which controls a circuit parameter to effect a change in volume output of the horn dependent upon a degree of travel of the paddle or other hand-operational portion. As one possible example, a potentiometer serves as the position sensor, and is substituted for switch 13 in the circuit of FIG. 4, and the horn 12 designed to emit a variable volume dependent upon a voltage level (the particular circuit parameter in the example). As such, an embodiment of a horn activation mechanism can provide a desired horn volume level dependent on relative displacement of the hand-operational portion of the actuation mechanism. Other circuits and circuit parameters to effect the above will be readily apparent to those skilled in the art, and such alternate designs can be adopted without departure from the invention.

FIG. 5 depicts an alternative embodiment of a horn actuation mechanism which takes the form of a push button switch mechanism 5b' which includes an internal switch, and which is conveniently, although not necessarily, shown housed in an auxiliary module for cruise control 4', which, as discussed above, includes a set button 4a', a resume button 4b' and a select button 4c'. Horn actuation is safely and effectively implemented by the same hand gripping the wheel simply by tapping the exposed button portion of the push button switch mechanism 5b' which serves as the hand-operational portion of the mechanism 5b'.

It is noted, that orientation of the horn actuation mechanism in accordance with the various contemplated embodiments of the invention to permit fingertip operation by digits of the hand opposed to the thumb when the driver's hand extends around the steering wheel gripping portion to a distant side of the steering wheel plane P is deemed advantageous to the invention. Moreover, it is thought to be particularly advantageous to implement operation of such horn actuation mechanism by movement of a switch comprising the actuation mechanism in a direction towards the driver, moved against a biasing in an opposed direction, or by movement in any direction which is implemented by a hand-closing or beckoning movement of the fingers opposed to the thumb.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A horn actuation mechanism for use in a vehicle for selectively actuating a horn, the vehicle including a steering wheel presenting a peripheral gripping region for controlled grasping of a rotational portion of the steering wheel rotatable about a steering wheel control axis by a hand of a driver facing the steering wheel, and in which a steering wheel plane lies crosswise the steering wheel control axis and approximates a plane bisecting the peripheral gripping region, the horn actuation mechanism comprising:

a switch; and
a hand-operational portion which communicates a hand motion implemented by the driver on a side of the steering wheel plane distant from the driver to effect an orientational change of the switch in response thereto, said horn being energized in response to said orientational change, said hand-operational portion being disposed in a position in which at least one finger opposed to a thumb of the hand grasping the peripheral gripping region of the wheel can simultaneously actuate the mechanism without removal of said hand from controlled contact with the wheel, said hand operational portion being mounted to a portion of the steering wheel which is rotatable, along with said rotational portion, approximately about said steering wheel control axis.

2. A horn actuation mechanism according to claim 1, further comprising an auxiliary module, said switch being located in said module, said hand operational portion being operable by the hand from outside said module.

3. A horn actuation mechanism according to claim 1, wherein said switch includes a position sensor which controls a circuit parameter to effect a change in volume output of the horn dependent upon a degree of operation of the hand-operational portion.

4. A horn actuation mechanism according to claim 3, wherein said position sensor is a potentiometer.

5. A horn actuation mechanism according to claim 1, wherein said hand-operational portion includes a hand-manipulatable structure movable by a closing movement of said at least one finger opposed to the thumb.

6. A horn actuation mechanism according to claim 1, wherein said hand-operational portion includes a push button.

7. A horn actuation mechanism according to claim 1, wherein:

a hand-operated audio control is disposed in an other position positionally isolated from said hand-operational portion so as to reduce confusion therewith when the user intends to actuate the horn or operate the audio control.

8. A method of actuating a horn in a vehicle which includes a steering wheel presenting a peripheral gripping region of a rotational portion of the steering wheel rotatable about a steering wheel control axis for controlled grasping by a hand of a driver facing the steering wheel, and in which a steering wheel plane lies crosswise the steering wheel control axis and approximates a plane bisecting the peripheral gripping region, the method comprising:

mounting at least a portion of a sensor for rotation approximately about said steering wheel control axis;

rotating said sensor along with said rotational portion of the steering wheel;

sensing a deliberate hand movement of the driver occurring on a side of the steering wheel plane distant from the driver by use of said sensor, said deliberate hand movement including movement of at least one finger opposed to a thumb of said hand, while said hand remains in controlled contact with the peripheral gripping region of the steering wheel; and energizing the horn in response to said movement of said at least one finger.

9. A method according to claim 8, wherein:

said at least a portion of the sensor includes a hand-operable portion; and said step of sensing a deliberate hand movement includes actuation of said hand operational portion by said at least one finger of said hand while said hand is concurrently in controlled contact with the peripheral gripping region.

10. A method according to claim 8, wherein said hand movement includes a movement of said at least one finger opposed to the thumb generally inward in a direction towards the rotational axis of the steering wheel.

11. A method according to claim 8, wherein said movement of said at least one finger effects at least partial closure of the hand.

12. A method according to claim 8, further comprising altering a volume of said horn dependent upon a magnitude of said deliberate hand movement.

13. A horn actuation mechanism for use in a vehicle for selectively actuating a horn, the vehicle including a steering wheel presenting a peripheral gripping region for controlled grasping of a rotational portion of the steering wheel rotatable about a steering wheel control axis by a hand of a driver operating the steering wheel, and in which a steering wheel plane lies crosswise the steering wheel control axis and approximates a plane bisecting the peripheral gripping region, the horn actuation mechanism comprising:

a hand-operational input portion; and circuitry which actuates the horn in response to operation of said hand-operational input portion, at least said hand-operational portion being mountable to a portion of the steering wheel which is rotatable, along with said rotational portion, approximately about said steering wheel control axis, such that said hand-operational input portion, when mounted, is operably accessible by at least one finger opposed to a thumb of a hand of the driver grasping the peripheral gripping region of the wheel the driver on a side of the steering wheel plane distant from the driver without removal of said hand from controlled contact with the wheel, operation of said hand-operational input portion causing said horn to sound.

14. A horn actuation mechanism according to claim 13, further comprising an auxiliary module mountable to said portion of the steering wheel which is rotatable, said module including at least said hand-operational input portion which is disposed to be operably accessible by the hand from outside said module.

15. A horn actuation mechanism according to claim 14, wherein said hand-operational input portion includes at least one of a push button and a biased lever.

16. A horn actuation mechanism according to claim 13, wherein said hand-operational input portion includes a structural configuration allowing operation of said hand-operational input portion by one of a closing movement and a tapping movement of said at least one finger opposed to the thumb.

17. A horn actuation mechanism according to claim 14, wherein said module is receivable in a position between a central portion of the steering wheel and said peripheral gripping region in a lower region of said steering wheel.

18. A horn actuation mechanism according to claim 14, wherein said module further includes at least one of a cruise control input and an audio control input.

19. A horn actuation mechanism according to claim 18, wherein said at least one of the cruise control input and the audio control input is positioned for operation by the driver from an other side of the steering wheel plane proximate to the driver.

* * * * *